United States Patent [19]

Kobashi et al.

[11] 4,130,525

[45] Dec. 19, 1978

[54] STABLE AQUEOUS EMULSION OF ACRYLONITRILE POLYMER, ITS PRODUCTION AND DYEABILITY IMPROVING AGENT COMPRISING SUCH EMULSION

[75] Inventors: Toshiyuki Kobashi; Hirotaka Shiota; Haruki Umetani, all of Okayama, Japan

[73] Assignee: Japan Exlan Company Limited, Japan

[21] Appl. No.: 772,334

[22] Filed: Feb. 25, 1977

[30] Foreign Application Priority Data

Mar. 5, 1976 [JP] Japan .................................. 51-24334

[51] Int. Cl.$^2$ .............................................. C08L 33/20
[52] U.S. Cl. ...................... 260/29.6 AN; 260/29.6 H; 260/29.6 SQ
[58] Field of Search ................. 260/29.6 AN, 29.6 H, 260/29.6 SQ, 79.3 NU; 526/88, 342

[56] References Cited

U.S. PATENT DOCUMENTS

| | | | |
|---|---|---|---|
| 3,202,641 | 8/1965 | Nakayima et al. | 260/29.6 AN |
| 3,547,898 | 12/1970 | Arlt et al. | 260/29.6 AN |
| 3,679,641 | 7/1972 | Takeya | 260/29.6 AN |
| 3,781,248 | 12/1973 | Sakai et al. | 260/29.6 AN |
| 3,873,508 | 3/1975 | Turner | 260/29.6 AN |
| 3,965,032 | 6/1976 | Gibbs et al. | 526/342 |

Primary Examiner—Lewis T. Jacobs
Attorney, Agent, or Firm—Wenderoth, Lind & Ponack

[57] ABSTRACT

A stable aqueous emulsion of an acrylonitrile polymer which comprises a dispersion system of said acrylonitrile polymer having a particle size of substantially less than 1μ in water and contains substantially no emulsifying agent nor dispersing agent. Said emulsion is produced by a process comprising; polymerizing acrylonitrile alone or in a monomer mixture comprising more than 60% by weight of acrylonitrile and as another component, at least one other ethylenically unsaturated compound, under stirring at a temperature higher than 120° C and at least autogenous pressure, in an aqueous system consisting essentially of water in an amount of 45 to 95% by weight based on the total weight of water and monomer(s), to thereby introduce at least $2\times10^{-5}$ mol per gram polymer of sulfonic acid groups or salts thereof and/or carboxylic groups or salts thereof into the resulting polymer, whereby an aqueous dispersion system comprising fine droplets of the polymer in substantially molten state is formed, and then cooling said aqueous dispersion system under stirring so that said polymer droplets may not gather together to form aggregates, said cooling of said aqueous dispersion system being to a temperature less than 100° C while maintaining said system at a pressure higher than the autogenous pressure.

10 Claims, No Drawings

STABLE AQUEOUS EMULSION OF ACRYLONITRILE POLYMER, ITS PRODUCTION AND DYEABILITY IMPROVING AGENT COMPRISING SUCH EMULSION

The present invention relates to a stable and homogeneous aqueous emulsion of a polymer consisting essentially of acrylonitrile (referred to as AN hereinafter), its production and a dyeability improving agent comprising such emulsion. More particularly, it relates to a stable aqueous emulsion comprising very fine particles of an AN polymer having a high content of AN (production of such emulsion has so far been considered very difficult), a method for the production thereof and a dyeability improving agent comprising such emulsion which can give excellent dyeing effects.

Recently, aqueous emulsions of synthetic polymer have become to be used, as they are, as modifying agents for plastic, fiber and film, as surface-finishing agents for paper and film, and as aqueous paints and pigments. Particularly, aqueous emulsions of AN polymer are strongly desired in these application fields, because the AN polymer is superior to other polymers in light-fastness, weathering fastness and the like. But, the present situation is that there is not yet found an industrially advantageous method for producing the aqueous emulsions of such AN polymer.

Generally speaking, an AN polymer has a strong cohesive force between particles thereof, and therefore when AN monomer is polymerized according to the ordinary emulsion polymerization or suspension polymerization which uses water as dispersing medium, the particles of the resulting polymer gather together to form coarse and voluminous aggregates. Once such aggregates are produced, it is no longer possible to divide them into the original individual fine particles by any mechanical means. Consequently, it was difficult to obtain a stable aqueous emulsion wherein the fine and uniform spherical particles of the AN polymer having a high AN content are dispersed in water.

For the reasons described above, the inventors extensively studied to obtain an aqueous emulsion of an AN polymer of high AN content. As a result, it has been found that such aqueous emulsion can be obtained by polymerizing AN alone or a monomer mixture consisting mainly of AN, at a specific pressure and temperature, in a water medium so that more than definite amount of sulfonic acid groups or salts thereof and/or carboxylic groups or salts thereof is introduced into the resulting polymer. By the introduction of such groups or salts thereof, the polymer particles are prevented from aggregation and thus the resulting AN polymer in a molten state forms an aqueous dispersion of fine droplets thereof. Further, it has been found that the thus obtained aqueous dispersion advantageously turns to a chemically and mechanically very stable aqueous emulsion which comprises extremely fine and spherical AN polymer particles, when cooled with stirring.

That is, an object of the present invention is to provide an aqueous emulsion of an AN polymer of high AN content which comprises extremely fine particles of said polymer and is chemically and mechanically very stable without the aid of the ordinary emulsifying agents and dispersing agents and also to provide a method for the production thereof.

Another object of the present invention is to give excellent dyeing effects to fiber and film, by using such aqueous emulsion as a dyeability improving agent.

The aqueous emulsion of AN polymer according to this invention comprises a dispersion system of said AN polymer having a particle size of substantially less than 1 $\mu$ in water and contains substantially no emulsifying agent nor dispersing agent, said AN polymer comprising AN alone or more than 60% by weight of AN and, as another component, at least one of other ethylenic unsaturated compounds and containing at least $2 \times 10^{-5}$ mole/gram·polymer of sulfonic acid groups or salts thereof and/or carboxylic groups or salts thereof. Such aqueous emulsion can advantageously be produced by polymerizing AN (acrylonitrile) alone or a monomer mixture comprising more than 60% by weight of AN and, as another component, at least one of other ethylenic unsaturated compounds with stirring, at a temperature not lower than 120° C. and at least at the self-generating pressure, in an aqueous system containing water of 45 to 95% by weight based on the total weight of water and monomer(s), thereby to introduce at least $2 \times 10^{-5}$ mole/gram·polymer of sulfonic acid groups or salts thereof and/or carboxylic groups or salts thereof into the resulting polymer, whereby an aqueous dispersion system comprising fine droplets of the polymer in substantially a molten state is formed, and then cooling the resulting aqueous dispersion system with stirring so that said polymer droplets do not gather together to form aggregates.

As described above, the aqueous emulsion of AN polymer according to the present invention is produced by the specific polymerization process which extremely weakens the cohesive force between the polymer particles while introducing a specific amount of sulfonic acid groups or salts thereof and/or carboxylic groups or salts thereof into the polymer. In this way, the aqueous emulsion of the present invention is kept in a good emulsion state, and moreover the polymer particles in the aqueous emulsion are extremely fine particles of substantially less than 1 $\mu$, particularly 500 to 300 m$\mu$ or less, in particle size. Since the dispersion stability of polymer particle in emulsion is effected mainly by the surface charges on the polymer particles, it depends upon the amount of sulfonic acid groups or salts thereof, or carboxylic groups or salts thereof, or the both introduced into the polymer. Consequently, when the amount introduced is less than the specific value described above, the polymer particles form a mass by aggregation and melt-sticking, and a good emulsion cannot be obtained. The dispersion stability of the present emulsion can further be improved by introducing both sulfonic acid groups or salts thereof and carboxylic groups or salts thereof into the polymer.

Consequently, the aqueous emulsion of AN polymer according to the present invention is remarkably characterized in that it contains no such emulsifying agent nor dispersing agent that is commonly mixed in the conventional synthetic polymer emulsions. Therefore, there are no foaming phenomenon in the use of the present emulsion and no need to add an antifoaming agent, so that workability is extremely improved. Moreover, the present aqueous emulsion is very stable without being broken and coagulated by the addition of electrolytes, heating or freezing, although it contains no ordinary emulsifying agent nor dispersing agent.

Further, the AN polymer in the aqueous emulsion of the present invention has a high content of AN and forms extremely fine and uniform spherical particles of substantially less than 1 μ in particle size. Accordingly, the aqueous emulsion can effectively exhibit the excellent properties characteristic of polyacrylonitrile polymers, and moreover it can easily penetrate into any raw material ithout a loss of transparency of the raw material, when applied for various purposes.

In order to produce the aqueous emulsion of AN polymer which can achieve the objects of the present invention, it is necessary to use AN alone or a monomer mixture comprising more than 60% by weight, preferably more than 70% by weight, particularly preferably more than 80% by weight, of AN and at least one of other ethylenically unsaturated compounds as another component.

As the ethylenic unsaturated compounds used for copolymerization with AN, there are exemplified well-known unsaturated compounds co-polymerizable with AN, for example, vinyl halides and vinylidenes halides such as vinyl chloride, vinyl bromide, vinyl fluoride, vinylidene chloride; unsaturated carboxylic acids and salts thereof such as acrylic acid, methacrylic acid, maleic acid, itaconic acid; acrylic esters such as methyl acrylate, ethyl acrylate, butyl acrylate, octyl acrylate, methoxyethyl acrylate, phenyl acrylate, cyclohexyl acrylate; methacrylic esters such as methyl methacrylate, ethyl methacrylate, butyl methacrylate, octyl methacrylate, methoxyethyl methacrylate, phenyl methacrylate, cyclohexyl methacrylate; unsaturated ketones such as methyl vinyl ketone, phenyl vinyl ketone, methyl isopropenyl ketone; vinyl esters such as vinyl formate, vinyl acetate, vinyl propionate, vinyl butyrate, vinyl benzoate; vinyl ethers such as vinyl ether, ethyl vinyl ether; acrylic amide and alkyl derivatives thereof; unsaturated hydrocarbon sulfonic acids and salts thereof such as vinylsulfonic acid, allylsulfonic acid, methallylsulfonic acid, p-styrenesulfonic acid; styrene and alkyl or halogen derivatives thereof such as styrene, α-methylstyrene, chlorostyrene; allyl alcohol and esters or ethers thereof; basic vinyl compounds such as vinyl pyridine, vinyl imidazole, dimethylaminoethyl methacrylate; and vinyl compounds such as acrolein, methacrolein, vinylidene cyanide, glycidyl methacrylate, methacrylonitrile. Among these compounds, preferred ones include unsaturated sulfonic acids and salts thereof, for example the aforesaid unsaturated hydrocarbon sulfonic acids and salts thereof (e.g. alkali metal salts, ammonium salts), and sulfoalkyl esters of acrylic acid or methacrylic acid (e.g. sulfoethyl methacrylate, sulfopropyl methacrylate) and salts thereof (e.g. alkali metal salts, ammonium salts); and the aforesaid unsaturated carboxylic acids and salts thereof (e.g. alkali metal salts, ammonium salts). That is, when the specific amount of aforesaid unsaturated sulfonic acid or salt thereof and/or aforesaid unsaturated carboxylic acid or salt thereof is used as co-polymerization component, it is easy to achieve the essential requirement of the present invention, in other words, to introduce more than $2 \times 10^{-5}$ mole/gram.polymer of sulfonic acid groups of salts thereof and/or carboxylic groups or salts thereof into the polymer.

The present polymerization process using such monomers is extremely different from the conventional aqueous suspension polymerization and emulsion polymerization in that the present process is carried out at a high temperature under pressure. In these conventional polymerization processes the polymers produced have essentially a solid form. Accordingly, the polymer particles produced in the polymerization systems are easy to form aggregates which retain their size, and the polymerization principally proceeds at the surface of the solid polymer particles. Contrary to this, since the polymers of the present invention are in the form of fine molten droplets, they are difficultly to form aggregates as compared with solid particles, and the polymerization proceeds not only at the surface of the molten droplets of the polymer but also in the inner part of the droplets. Moreover, even though the polymer droplets collide with one another to form aggregates, the aggregates are re-divided into single spherical molten droplets by surface tension. Consequently, when such molten droplets are solidified by cooling, very fine, transparent, dense and spherical polymer particles are obtained.

The particle size of the polymer resulting from such polymerization process depends upon the size of molten droplets of the polymer in the polymerization system. In order to obtain the objective aqueous emulsion which comprises acrylonitrile polymer particles having an average particle size of substantially less than 1 μ, preferably less than 500 mμ, and most preferably less than 300 mμ, it is neccessary to introduce, while moderately stirring the polymerization system, as least $2 \times 10^{-5}$ mole/gram.polymer, and preferably at least $3 \times 10^{-5}$ mole/gram·polymer, of sulfonic acid groups or salts thereof and/or carboxylic groups or salts thereof into the polymer. When the amount of sulfonic acid groups (salts) and/or carboxylic groups (salts) introduced is too small, the molten droplets of polymer form a large mass by aggregation so that the fine particles of polymer can not be obtained. On the other hand, as the amount introduced becomes larger, the particle size of the molten droplets becomes smaller and therefore the particle size of the spherical polymer ultimately obtained becomes also smaller. For the practical purposes, however, the amount to be introduced should be limited to less than $1.5 \times 10^{-3}$ mole/gram·polymer, and preferably less than $1 \times 10^{-3}$ mole/gram·polymer. The term "mole/gram·polymer" referred to herein means the number of mole of sulfonic acid groups or salts thereof and/or carboxylic groups or salts thereof contained in 1 gram of the polymer.

Introduction of carboxylic group or salt thereof into polymer can be attained, as mentioned above, by copolymerizing an unsaturated carboxylic acid or salt thereof. And, introuction of sulfonic acid group or salt thereof into polymer can be attained, as mentioned above, by using an unsaturated sulfonic acid or salt thereof as co-polymerization component, or by using a reductive sulfoxy compound (for example sulfites) as one component of polymerization initiator, or by using a chain transfer agent (for example $SO_2$) which acts to introduce sulfonic acid groups or salts thereof into the terminals of polymer molecules.

The polymers resulting from the polymerization process of the present invention should be kept in the state wherein the fine molten droplets of the polymers form a stable dispersion system. Consequently, it is necessary to adjust the amounts of the monomer and water charged in a reaction vessel so that the amount of water is 45 to 95% by weight, and preferably 55 to 90% by weight, based on the total weight of the monomer(s) and water. Further, the polymerization system should be kept at higher than the self-generating pressure, in other words, at higher than the vapor pressure spontaneously generated under the polymerization conditions.

The polymerization temperature should be higher than 120° C., and preferably 130° C. or higher. The aqueous dispersion of the present invention comprising very fine and homogeneous molten droplets of AN polymer can be obtained only when such polymerization conditions are satisfied. The objects and effects of the present invention are achieved with difficulty when the polymerization conditions outside the above-mentioned ranges are employed. The preferred upper limit of polymerization temperature is lower than 300° C., and preferably lower than 250° C., taking into account the preparation of reaction equipments and deterioration of the qualities of resulting polymers such as decomposition and coloration.

The polymerization of the present invention should be carried out in a polymerization vessel with a stirrer which can be tightly closed or have a suitable pressure-applying means, in order to keep the inner pressure at higher than the vapor pressure (self-generating pressure) spontaneously generated under the polymerization conditions, and preferably at higher than about 3 atm. Any polymerization pressure higher than the above-mentioned vapor pressure (self-generating pressure) may be employed. For example, the polymerization of the present invention may be carried out even under a pressure higher than 100 atm. or as high as 1,000 atm. or more. In general, however, about 5 to about 50 atm. is suitable from the standpoint of industrial operation.

Any well-known method may be applied to start the polymerization of the present invention. For example, the polymerization may be started according to the radical polymerization using a radical generating agent (e.g. peroxide, azo-compound), or a redox catalyst which is a combined catalyst of a peroxide and a reducing agent, the direct photo-polymerization by ultraviolet ray irradiation, the photo-sensitive polymerization in the presence of a photo-sensitizer, and the γ-ray irradiation polymerization. Further particulars on these polymerization processes are described in Japanese patent application Nos. 92,911/1974 and 84,183/1975 and U.S. patent applns. Ser. Nos. 604,043 and 738,699. The present invention may advantageously be carried out on the basis of the conditions described in these patent applications.

Next, the aqueous dispersion of the fine molten droplets of AN polymer which is produced according to the present polymerization is cooled to a temperature lower than the melting point of said polymer, and generally less than about 100° C., during which the dispersion is stirred in order to prevent the molten droplets from aggregation. In this way, the molten droplets of polymer are solidified to form an aqueous dispersion of solid and fine spherical polymer particles, that is, an aqueous emulsion of the fine particles of acrylonitrile polymer. Also in this cooling process, it is desirable to keep the aqueous dispersion at a pressure higher than the self-generating pressure, in order to prevent the fine particles of AN polymer in a molten state from foaming.

The thus obtained aqueous emulsions of AN polymer exhibit the following excellent performance which could not be obtained by the conventional methods. The emulsion is much superior in stability against aggregation and freezing, although it contains no ordinary surface active agent (emulsifying agent) nor dispersing agent. The emulsion contains no organic solvents such as aromatic hydrocarbons and halogenated organic compounds. Complicated processes such as a dispersion treatment by physical means are not required to prepare the emulsion. The AN content of the polymer is more than 60% and it is further increased to more than 70% so that the excellent properties characteristic of polyacrylonitrile polymers (for example high hardness of the polymer particles) can be exhibited sufficiently. Particularly, the aqueous emulsions of AN polymer according to the present invention have a polymer concentration of more than 10% by weight, and particularly more than 15% by weight, and therefore they are used advantageously for various purposes. The aqueous emulsions cause no aggregation of polymer particles even when heated or concentrated, and therefore it is easy to produce an emulsion having a higher polymer concentration.

The aqueous emulsions of AN polymer according to the present invention may widely be used for various purposes, as they are or as a solid separated from the emulsion by spraying or drying. For example, they are used as modifiers for plastics, fibers and films; as surface-finishing agents for papers and films; as water-base paints and pigments; and as materials for powder molding and powder coating. Further, the aqueous emulsions exhibit excellent performance as a flatting agent for coated surfaces. Particularly, said emulsions can preferably be used as dyeability improving agents for fibers and films. That is, when said emulsion is added to spinning solutions or film-forming solutions, the dyeability of the resulting molded products such as fiber and film is remarkably improved, and furthermore essentially undyeable molded products become to be well dyeable with basic dyes or cationic dyes. As the fiber-like or film-like base materials used for such purposes, there are exemplified celluloses (for example rayon, cupra, acetate, triacetate, cellophane), polyvinyl alcohols, polyvinyl chlorides, polyvinylidene chlorides, polyamides, polyesters, polyureas, polystyrenes, polyurethanes, polyacrylonitriles, polyvinylidene cyanides, polyfluoroethylenes and the like.

By dyeing the AN polymer emulsions of the present invention, there are obtained colored fine particles or emulsions thereof. They keep a stable emulsion in water with no aggregation of particles. They are very fine particles of less than 500 mμ in particle size, brilliant, and are superior in color-development and various fastnesses such as light-fastness, weathering fastness and chemical resistance. Consequently, they can widely be used as organic pigment, serve to improve the transparency of colored products or colored surfaces to a large extent, and enable uniform coloration, whereby the value of colored products is extremely enhanced. For preparing such colored fine particles, basic dyes, acidic dyes, direct dyes, dispersion dyes, metal-containing dyes, fluorescent dyes, etc. may be used. However, the use of cationic dyes usually used for dyeing acrylic fibers is most preferable.

Further, by co-polymerizing AN and other monomer, for example ethyl acrylate or butyl acrylate, which can form form a single homopolymer having a low Tg (glass transition temperature), there are obtained aqueous emulsions of AN polymer having a film-forming property. Since such film-forming aqueous emulsions of AN polymer contain no emulsifying agent, they are advantageously used without various trables frequently encountered in the use of ordinary polymer emulsions.

The present invention will be illustrated more specifically with reference to the following examples. However, the scope of the present invention is not limited to these examples. Unless otherwise stated, all the parts and percentages in the examples are by weight.

EXAMPLE 1

450 parts of AN, 40 parts of methyl acrylate (MA), 16 parts of sodium p-styrenesulfonate (SPSS) and 1,181 parts of water were charged in a 2,000-ml autoclave and di-tert-butylperoxide was added thereto as polymerization initiator in an amount of 0.5% based on the total weight of the monomers. The autoclave was tightly closed and polymerization was carried out at 160° C. for 10 minutes with stirring. After the reaction was completed, the polymerization product was cooled to about 90° C. with stirring and taken out of the autoclave. This product was a stable aqueous emulsion which comprises extremely fine AN polymer particles of about 65 m$\mu$ in average particle size. The polymer concentration of the emulsion was 27% and aggregation of the polymer particles was not observed in the emulsion. Further, it was found that this polymer contained about $1.6 \times 10^{-4}$ mole/gram-polymer of sulfonate group ($-SO_3Na$).

This aqueous emulsion of AN polymer was frozen by cooling it to $-10°$ C. and re-molten by warming, but the emulsion recovered its original dispersion state and showed no aggregation of polymer particles. Consequently, it became apparent that this emulsion is extremely stable to freezing.

When this emulsion was concentrated by heating until the polymer concentration became 40%, no aggregation of the emulsion was observed. On further concentrating the emulsion to about 50% polymer concentration, the emulsion turned to a paste-like emulsion.

EXAMPLE 2

500 parts of AN, 15.5 parts of SPSS and 1,203 parts of water were charged in a 2,000-ml autoclave and di-tert-butylperoxide was added thereto as polymerization initiator in an amount of 0.5% based on the total weight of the monomers. The autoclave was tightly closed and polymerization was carried out at 160° C. for 17 minutes with stirring. After the reaction was completed, the polymerization product was cooled to about 90° C. with stirring and taken out of the autoclave. Thus, a stable aqueous emulsion (polymer concentration: 25%) comprising fine AN polymer particles of about 70 m$\mu$ in average particle size was obtained. Further, it was found that this polymer contained about $1.5 \times 10^{-4}$ mole/gram-polymer of sulfonate groups.

Sodium sulfate was added as electrolyte to this aqueous emulsion of AN polymer in the ratio of 50/50 of polymer/sodium sulfate, but no aggregation of the emulsion took place. This clearly means that this aqueous emulsion is extremely stable to electrolytes.

EXAMPLE 3

450 parts of AN, 40 parts of MA, 11 parts of methacylric acid (MAA), 43.5 parts of SPSS and 1,270 parts of water were charged in a 2,000-ml autoclave and di-tert-butylperoxide was added thereto as polymerization initiator in an amount of 0.5% based on the total weight of the monomers. The autoclave was tightly closed and polymerization was carried out at 150° C. for 23 minutes with stirring. After the reaction was completed, the polymerization product was cooled at about 90° C. with stirring and taken out of the autoclave. Thus, a stable aqueous emulsion (polymer concentration: 21%) comprising fine AN polymer particles of about 100 m$\mu$ in average particle size was obtained. Further, it was found that this polymer contained about $4.0 \times 10^{-4}$ mole/gram-polymer of sulfonate groups ($-SO_3Na$) and about $2.4 \times 10^{-4}$ mole/gram-polymer of carboxylic groups ($-COOH$).

This aqueous emulsion of AN polymer had a pH of 6. The pH of this emulsion was lowered to 1.0 by adding 5% dilute sulfuric acid, but no breaking of the emulsion was observed. When the pH of this emulsion was raised to 13.0 by adding 5% aqueous sodium hydroxide solution, but no aggregation of the emulsion took place. Consequently, it became apparent that the emulsion of the present invention has excellent pH stability in both acidic and alkaline regions.

Next, the aqueous emulsion was tested for the ability to make polyvinyl alcohol (PVA) fibers dyeable (particularly with basic dyes), by adding this emulsion to a PVA spinning solution comprising 15 parts of PVA and 85 parts of water. In this test, the emulsion was added to the PVA spinning solution so that the weight ratio of PVA to fine polymer particle was 100 to 14, when the fine polymer particles were homogeneously dispersed in the spinning solution with no aggregation. Thereafter, the spinning solution was subject as usual to wet spinning, followed by the ordinary heat treatment and chemical treatment. As a result, the resulting PVA fibers had excellent transparency without causing devitrification owing to the fine polymer particles introduced into the fibers. The PVA fibers were dyed with Sumiacryl Brilliant Red N-4G (cationic dye produced by Sumitomo Chemical Co., Ltd.) to obtain a dyed product of extremely brilliant red color. The proportion of dye to fiber was 0.2 to 100 and dyeing temperature $\times$ dyeing time was 90° C. $\times$ 60 min.

EXAMPLE 4

A reaction mixture comprising 490 parts of AN, 5 parts of MAA, 26 parts of SPSS and 1,218 parts of water was polymerized according to Example 2 except that the polymerization temperature was 150° C. As a result, a stable aqueous emulsion (polymer concentration: 21%) comprising AN polymer particles of about 100 m$\mu$ in average particle size was obtained. The AN polymer contained about $3.0 \times 10^{-4}$ mole/gram-polymer of sulfonate groups and about $1.4 \times 10^{-4}$ mole/gram-polymer of carboxylic groups. This aqueous emulsion was extremely stable and showed no aggregation even when allowed to stand for a long time.

EXAMPLE 5

450 parts of AN, 40 parts of MA, 11 parts of MAA, 20 parts of sodium methallylsulfonate and 1,216 parts of water were charged in a 2,000-ml autoclave and hydrogen peroxide was added thereto as polymerization initiator in an amount of 1.0% based on the total weight of the monomers. The autoclave was tightly closed and polymerization was carried out at 160° C. for 20 minutes with stirring. After the reaction was completed, the polymerization product was cooled to about 90° C. with stirring and taken out of the autoclave. Thus, a stable aqueous emulsion (polymer concentration: 20%) comprising AN polymer particles of about 100 m$\mu$ in average particle size was obtained. The AN polymer contained about $2.4 \times 10^{-4}$ mole/gram-polymer of sulfonate groups and about $2.5 \times 10^{-4}$ mole/gram-polymer of carboxylic groups.

EXAMPLE 6

444 parts of AN, 141 parts of MA, 12 parts of MAA, 3 parts of sodium methallylsulfonate and 1200 parts of water were charged in a 200-ml autoclave, and hydrogen peroxide was added thereto as polymerization initiator in an amount of 1.0% based on the total weight of the monomers. The autoclave was tightly closed and polymerization was conducted at 160° C. for 20 minutes with stirring. After the polymerization the product was cooled to about 90° C. with stirring and taken out of the autoclave. Thus, a stable aqueous emulsion (polymer concentration: 23.5%) comprising AN polymer particles of about 500 m$\mu$ in average particle diameter. The AN polymer contained about $2.3 \times 10^{-5}$ mole/gram-polymer of sulfonate groups and about $1.7 \times 10^{-4}$ mole/gram-polymer of carboxylic groups.

For comparison 342 parts of AN, 246 parts of MA, 9 parts of MAA, 3 parts of sodium methallylsulfonate and 1200 parts of water were charged in a 2000-ml autocalve. The polymerization was conducted under the same conditions as above. After the polymerization the product was taken out of the autoclave in the same manner as above. The particle size of the polymer in the resulting was very large such as several tens microns, and the polymer particle was extremely deformed from spherical form, and the stability of the emulsion was very poor.

COMPARATIVE EXAMPLE 76 parts of AN, 22 parts of butyl acrylate, 2 parts of SPSS, 0.415 part of sodium pyrophosphite, 0.0016 part of ferrous chloride and 355 parts of deionized water were charged in a one liter 5-mouthed flask provided with a dropping funnel, reflux condenser, thermometer and stirrer. The mixture was kept at 40° C. while stirring. Into this flask were dropwise added 50 parts of 10% aqueous solution of ammonium persulfate in 30 minutes. The viscosity of the mixture started to be sharply increased upon lapse of 15 minutes from the beginning of said dropwise addition, and the whole became a gel after further 10 minutes and agitation became impossible.

What is claimed is:

1. A stable aqueous emulsion of an acrylonitrile polymer which comprises a dispersion system of said acrylonitrile polymer having a particle size of substantially less than 1$\mu$ in water and contains substantially no emulsifying agent nor dispersing agent, said emulsion being produced by a process comprising; polymerizing acrylonitrile alone or in a monomer mixture comprising more than 60% by weight of acrylonitrile and as another component, at least one other ethylenically unsaturated compound, under stirring at a temperature higher than 120° C. and at least autogenous pressure, in an aqueous system consisting essentially of water in an amount of 45 to 95% by weight based on the total weight of water and monomer(s), to thereby introduce at least $2 \times 10^{-5}$ mol per gram polymer of sulfonic acid groups or salts thereof and/or carboxylic groups or salts thereof into the resulting polymer, whereby an aqueous dispersion system comprising fine droplets of the polymer in substantially molten state is formed, and then cooling said aqueous dispersion system under stirring so that said polymer droplets may not gather together to form aggregates, said cooling of said aqueous dispersion system being to a temperature less than 100° C. while maintaining said system at a pressure higher than the autogeneous pressure.

2. An aqueous emulsion according to claim 1 which contains at least 10% by weight of said acrylonitrile polymer.

3. An aqueous emulsion according to claim 1 wherein said other ethylenically unsaturated compounds are unsaturated sulfonic acids or salts thereof.

4. An aqueous emulsion according to claim 1 wherein said other ethylenically unsaturated compounds are unsaturated sulfonic acids or salts thereof and unsaturated carboxylic acids or salts thereof.

5. A method for the production of a stable aqueous acrylonitrile polymer which comprises polymerizing acrylonitrile alone or in a monomer mixture comprising more than 60% by weight of acrylonitrile and as another component, at least one other ethylenically unsaturated compound, under stirring at a temperature higher than 120° C. and at least autogeneous pressure, in an aqueous system consisting essentially of water in an amount of 45 to 95% by weight based on the total weight of water and monomer(s), to thereby introduce at least $2 \times 10^{-5}$ mol per gram polymer of sulfonic acid groups or salts thereof and/or carboxylic groups or salts thereof into the resulting polymer, whereby an aqueous dispersion system comprising fine droplets of the polymer in substantially molten state is formed, and then cooling said aqueous dispersion system under stirring so that said polymer droplets may not gather together to form aggregates, said cooling of said aqueous dispersion system being to a temperature less than 100° C. while maintaining said system at a pressure higher than the autogenous pressure.

6. A method according to claim 5 wherein sulfonic acid groups or salts thereof and/or carboxylic groups or salts thereof are introduced into said polymer by copolymerizing said acrylonitrile with an unsaturated sulfonic acid or salt thereof and/or unsaturated carboxylic acid or salt thereof.

7. A dyeability improving agent comprising the aqueous emulsion of claim 1.

8. A dyeability improving agent comprising the aqueous emulsion of claim 2.

9. A dyeability improving agent comprising the aqueous emulsion of claim 3.

10. A dyeability improving agent comprising the aqueous emulsion of claim 4.

* * * * *